Dec. 8, 1953          A. RÜEGG          2,661,640
DEVICE FOR SHAPE-TURNING AND FOR THE PRODUCTION
OF HOLLOW SHAPES AND TURNED PARTS BY MEANS OF
A ROTATING CUTTING TOOL ON MACHINE TOOLS
Filed June 15, 1951
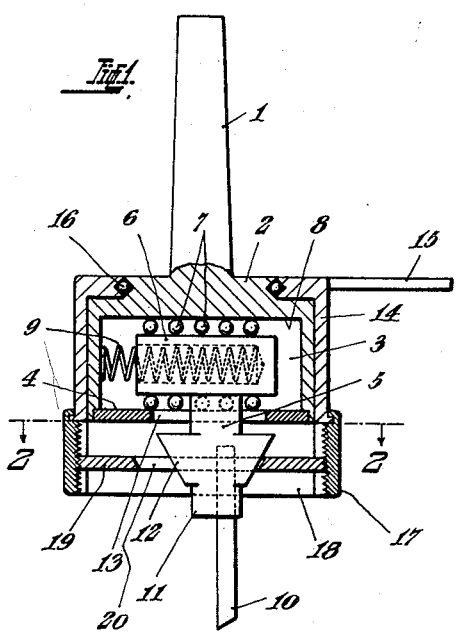
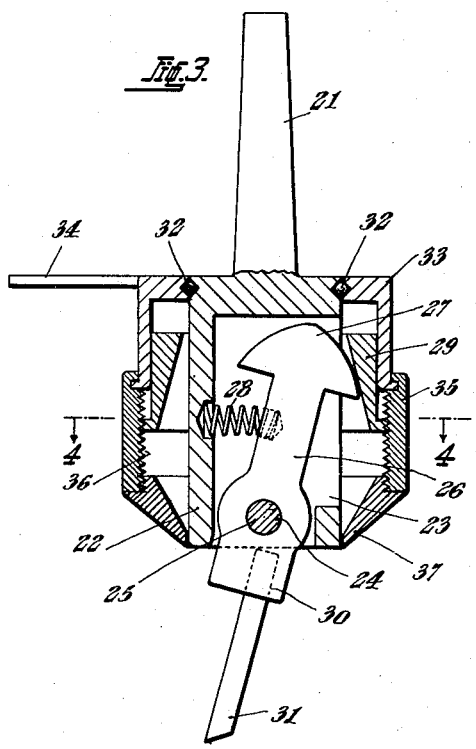
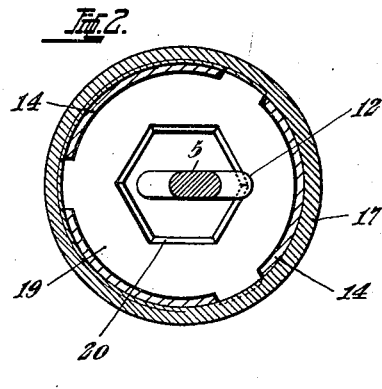
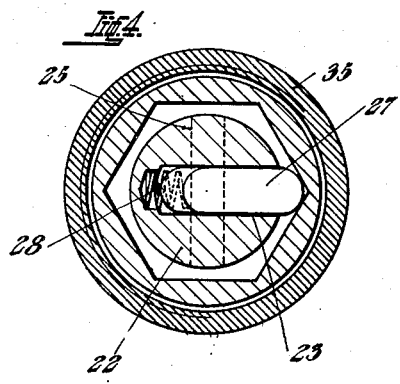
INVENTOR:
ARNOLD RÜEGG
BY Patented Dec. 8, 1953

2,661,640

UNITED STATES PATENT OFFICE 2,661,640

DEVICE FOR SHAPE-TURNING AND FOR THE PRODUCTION OF HOLLOW SHAPES AND TURNED PARTS BY MEANS OF A ROTATING CUTTING TOOL ON MACHINE TOOLS

Arnold Rüegg, Gumligen, near Bern, Switzerland, assignor to ARMAG Spezialwerkzeuge- und Maschinen A. G., Gumligen, Switzerland Application June 15, 1951, Serial No. 231,842

Claims priority, application Switzerland September 22, 1950

10 Claims. (Cl. 77—61)

Devices for shape-turning by means of rotating tools are known. In these the tool is guided by a template arranged above the work piece. Such cutting tools must have a definite profile and cannot take the form of a unilaterally cutting cutter.

The object of the present invention is a device for shape-turning and the manufacture of hollow shapes and turned parts by means of a rotating cutting tool on machine tools, said device having a head with an internal hollow space, said head being arranged on a tapered carrier spindle inserted in the end of a rotating arbor, a tool carrier with its cutting tool adapted to be displaced in relation to the rotational axis being arranged within said hollow space, said tool carrier being provided at one end with a shaped part tapered on the outside engaging in an aperture of a displaceable guiding template guided in said head by which template the displacement of said tool carrier with its cutting tool is effected, said guiding template being displaceably and adjustably held stationary in an adjustable ring of an annular carrier provided with a handle and rotatably guided in said head, whilst the tool carrier revolves within said guiding template so that the amount of displacement of said tool carrier with its cutting tool in said head and thus the dimensions of the shape to be produced according to said aperture in said guiding template can be altered by axial displacement of said guiding template in the head.

In the drawings accompanying and forming part of this specification two embodiments of the present invention are illustrated by way of example in which:

Fig. 1 is a first embodiment in longitudinal section.

Fig. 2 a section along line II—II of Fig. 1.

Fig. 3 a second embodiment in longitudinal section, and

Fig. 4 a section along line IV—IV of Fig. 3.

For connection with a driving arbor the device has a tapered carrier spindle 1 rigidly connected to the head 2. The head 2 has a hollow space 3 closed at the bottom by a plate 4 in which the tool carrier 5 capable of being displaced at right angles to the rotational axis of the device is inserted. The tool carrier 5 consists of a prismatic part 6 displaceably supported on balls (diagrammatically shown) on the top wall 8, on the sides of the hollow space 3 of the head and on the bottom plate 4 and displaced towards the opposite side of the cutting direction of the cutting tool 10 in the tool carrier 5 by means of a coil spring 9 disposed in a bore of the prismatic part 6. At the bottom of said prismatic part the carrier head 11 and above this a tapered guiding part 12 are connected with said prismatic part by means of an intermediate piece, said parts projecting out of the head 2 through an opening 13 in the plate 4. Externally embracing the head 2 there is rotatably arranged thereon an annular carrier or member 14 provided with a handle 15, said carrier 14 being guided at its upper end on the head 2 by means of the balls 16. At the lower end of the carrier 14 a ring 17 is pivotally connected therewith, said ring being provided with an internal thread 18 with which thread the outside edge of the guiding template 19 meshes. Said guiding template has an aperture 20 corresponding in outline to the hollow shape of the work piece to be produced and having its edge beveled in accordance with the taper of the guiding part 12 of the carrier head 11 projecting out of the head 2 through said aperture 20. If the guiding template 19 is displaced more to the top by rotation of the ring 17, the displaceability of the tapered guiding part 12 in the template aperture 20 is reduced and thus the outside dimensions of the shape to be produced are also decreased. On displacement of the template 19 in the opposite direction said dimensions are on the other hand increased.

In operation the head 2 together with the tool-carrier and its cutting tool revolve, whilst the outer annular carrier 14 is held by the handle 15 and prevented from rotating. Thus the guiding template 19 is stationary, and the tapered guiding part 12 of the tool carrier rotates in the aperture of said template and gives the cutting tool 10 a corresponding rotary motion which is in accordance to the shape of the aperture 20 due to the action of the coil spring 9.

According to the second embodiment shown in Figs. 3 and 4 the head 22 arranged on the carrier spindle 21 has a slot 23 open to one side and at the end opposite to said spindle 21 a transverse hole 24.

In the latter the pin 25 with the tool carrier 26 is mounted for pivoting about said pin 25. The tool carrier 26 is adapted as a two-armed lever the head 27 of which capable of being displaced in said slot 23 is adapted as a tracer finger which is forced outwardly against a cam-shaped annular template 29 by a coil spring 28. At the end opposite to the tracer finger the tool carrier has an aperture 30 in which the cutting tool 31 is secured. Arranged for rotation about the axis of the head 22 the bell-shaped ring 33 with the handle 34 is guided and mounted on said head 22 by means of balls 32, the ring 35 provided with an internal thread 36 is fitted to the edge of said bell-shaped ring 33 facing downwardly for rotation thereabout and is braced against the head 22 by means of a tapered closure ring 37. In the ring 35 the annular template 29 is inserted, said annular template being provided on the inside with a contour conforming to the shaped object to be produced, the head 22 of the tracer finger bearing against the inside surface of the annular template 29 under the action of the spring 28. By axial displacement of the annular template 29 the size of the shape to be machined by the cutting tool can be altered.

For machining the head 22 is inserted in the bore of the arbor of a machine tool by means of the carrier spindle 21 and is set in rotation. The outer ring 33 is held by the handle 34 and prevented from rotating. Thereby the head 27 of the tracer finger slides along the inner surface of the annular template 29 and displaces the cutting tool 31 against the action of the spring 28 and against the centrifugal force acting on the tool carrier according to the annular template.

What I claim and wish to secure by Letters Patent is:

1. A device for shaping articles comprising a carrier spindle for attachment to rotary means, a head connected to said spindle and provided with a hollow space, a carrier for a tool supported in said head within said space thereof for displacement in relation to the rotational axis of said spindle, a guiding part for said tool carrier, an annular member seated on said head, a handle portion holding said annular member stationary while said carrier spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding part of said tool carrier to thereby alter dimensions of the shape of an article to be worked upon according to the contour of the aperture of said template.

2. A device for shaping articles comprising a carrier spindle for attachment to rotary means, a head connected to said spindle and provided with a hollow space, plate means closing the opening of the hollow space and including a centrally slotted opening, a carrier for a tool, means for supporting said carrier in said head within said hollow space, said means including roller bearing means allowing lateral displacement of the tool carrier while preventing longitudinal displacement thereof, resilient means mounted between said head and said tool carrier, a guiding part on said tool carrier, an annular member seated on said head, a handle portion holding said annular member stationary while said carrier spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding part of said tool carrier to thereby alter dimensions of the shape of an article to be worked upon according to the contour of the aperture of said template.

3. A device for shaping articles comprising a carrier spindle for attachment to rotary means, a head connected to said spindle and provided with a hollow space, a carrier for a tool adapted to receive said tool at one end thereof, means for supporting said tool carrier in said head within said hollow space, said means including a pin providing a pivotal mounting for said carrier, resilient means mounted between said head and said tool carrier, a guiding part at the other end of said tool carrier, and an annular member seated on said head, a handle portion holding said annular member stationary while said carrier spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding part of said tool carrier to thereby alter dimensions of the shape of an article to be worked upon according to the contour of the aperture of said template.

4. A device for shaping articles comprising a carrier spindle for attachment to rotary means, a head connected to said spindle and provided with a hollow space, slot means in said head, a carrier for a tool adapted to receive said tool at one end thereof, means for supporting said tool carrier in said head within said hollow space, said means including a pin providing a pivotal mounting for said carrier, resilient means mounted between said head and said tool carrier, a guiding part at the other end of said tool carrier, and an annular member seated on said head, a handle portion holding said annular member stationary while said carrier spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding part of said tool carrier through said slot means to thereby alter dimensions of the shape of an article to be worked upon according to the contour of the aperture of said template.

5. A device as set forth in claim 4, comprising a tapered annular closure ring fitted to the edge of said adjusting ring for bracing the annular carrier, adjusting ring, and guiding template against lateral displacement.

6. A device for shaping articles comprising a spindle, a head connected to said spindle and provided with a hollow space, a carrier for a tool, means supporting said tool carrier within said space and including bearing means for said tool carrier whereby the latter may be displaced laterally to the axis of said spindle within said space, resilient means mounted between said head and said tool carrier, guiding means on said tool carrier, an annular member seated on said head, means holding said annular member stationary while said spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding means of said tool carrier to thereby alter dimensions of the shape of an article to be worked upon according to the contour of the aperture of said template.

7. A device for shaping articles comprising a spindle, a head connected to said spindle and provided with a hollow space, a carrier for a tool, means supporting said tool carrier and said head within said space and including bearing means for said tool carrier whereby the latter is held against displacement longitudinally to the axis of said spindle and for displacement with said head, means for allowing displacement of said tool carrier laterally to the axis of said spindle, resilient means mounted between said head and said tool carrier, a prismatically shaped guiding means at the end of the tool carrier on which the tool is mounted, an annular member seated on said head, means holding said annular member stationary while said carrier spindle rotates about said axis, and an adjusting ring internally threaded and attached to said annular member, said ring being adapted to threadedly and interchangeably receive an apertured template, whereby said template when inserted and threadedly displaced in said ring controls the movement of said guiding means of said tool carrier to thereby alter dimensions of the shape of an article to be worked upon according to the contour of the aperture of said template.

8. A device for working articles by boring, turning and like operations, comprising a head provided with an internal hollow space, a plate having an opening and connected to said head for substatially closing said space, a spring-supporting carrier for a tool seated wtihin said hollow space, said carrier extending through said opening and being provided with guiding means and with a carrier head for supporting said tool, a cup-shaped body on which said first-mentioned head is pivoted, and a support connected to said body for securement of a template on said support, said template being provided with a shaped opening along which said guiding means is guided while said tool is supported by said carrier head.

9. A device for working articles by boring, turning and like operations, comprising a head provided with a bore open at one side, said head having a transverse hole intersecting said bore, a pin inserted in said hole, a two-armed tool carrier supported by said pin, a stationary cup-shaped body on which said head is pivoted, said tool carrier being provided with a guiding surface for engaging a template displaceably connected to said cup-shaped body, and a support on said body for holding a ring substantially in contact with said head and for retaining said template, said carrier having an arm projecting beyond said bore and provided with an opening in which a tool may be fastened.

10. A device for working articles by boring, turning and like operations, comprising a head with an internal hollow space, tool carrier means within said hollow space, means within said hollow space for guiding said carrier, and means facilitating displacement of said guiding means relative to said tool carrier means to thereby alter dimensions of the shape of an article to be worked upon according to the contour of an aperture provided in a portion of said guiding means.

ARNOLD RÜEGG.

References Cited in the file of this patent

UNITED STATES PATENTS

| Number | Name | Date |
| --- | --- | --- |
| 473,027 | Smith | Apr. 9, 1892 |
| 628,703 | Fletcher | July 11, 1899 |